R. H. SHAW.
METHOD FOR DETERMINING THE CONTENT OF BUTTER FAT IN BUTTER.
APPLICATION FILED MAY 20, 1912.
1,052,098.
Patented Feb. 4, 1913.
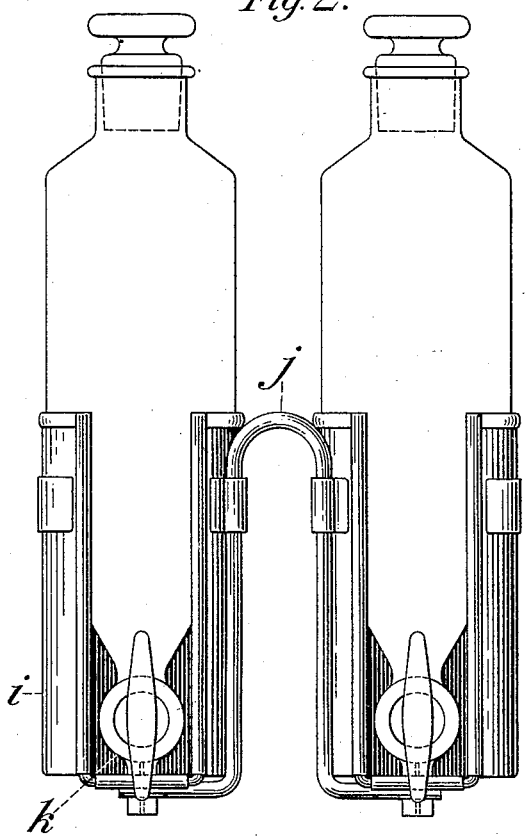
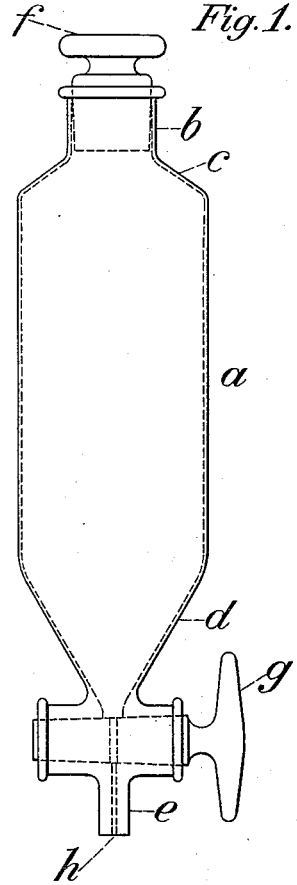
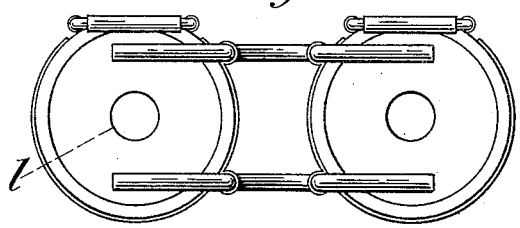

UNITED STATES PATENT OFFICE.

ROSCOE H. SHAW, OF WASHINGTON, DISTRICT OF COLUMBIA.

METHOD FOR DETERMINING THE CONTENT OF BUTTER-FAT IN BUTTER.

1,052,098. Specification of Letters Patent. Patented Feb. 4, 1913.

Application filed May 20, 1912. Serial No. 698,671.

(DEDICATED TO THE PUBLIC.)

*To all whom it may concern:*

Be it known that I, ROSCOE H. SHAW, a citizen of the United States of America, and an employee of the Department of Agriculture of the said United States, residing in the city of Washington, District of Columbia, (whose post-office address is Washington, District of Columbia,) have invented a new and useful Method for Determining the Content of Butter-Fat in Butter.

This application is made under the act of March 3, 1883, chapter 143 (22 Stat., 625), and the invention herein described and claimed may be used by the Government of the United States, or any of its officers or employees, in the prosecution of work for the United States, or by any person in the United States, without the payment of any royalty thereon.

The object of my invention is to provide a novel and simple method for determining with exactness the quantity of fat in butter.

My method consists in taking a sample of butter and first removing therefrom the salt and part of the curd with hot water, then dissolving the remaining curd into dilute sulfuric acid, and then drawing off the acid solution from the fat and weighing the latter.

The accompanying drawing illustrates the apparatus employed in practising my invention.

Figure 1 is a side perspective view of a specially constructed funnel. Fig. 2 is a side view of a pair of said funnels arranged in specially constructed sockets, and Fig. 3 is a bottom view showing openings in the bottom of the sockets.

Referring to the drawing, $a$ represents the barrel of the funnel having a neck, $b$, shoulder, $c$, tapering bottom, $d$, and capillary stem, $e$, and a top, $f$.

$g$ designates a stopcock which intercepts the flow or permits the passage of liquid from the barrel, $a$, through the bore hole, $h$.

I have devised the funnel illustrated exclusively for use in making the tests herein described.

In practising my method, I procure a sample of butter for the test with a butter trier, and place such sample in a suitable container preferably a Mason preserve jar, and then place the container in hot water at a temperature of approximately 100° F. The sample is then mixed with a spatula or spoon until it attains the consistency of thick cream. Following this I carefully weigh out 20 grams of the sample thus prepared, and transfer this charge of butter to the separatory funnel hereinbefore illustrated. I then fill the barrel, $a$, of the funnel nearly to the neck, $b$, with hot water. The stopcock, $g$, is adjusted so as to prevent the liquid in the barrel, $a$, from flowing through the bore hole, $h$. I then set the funnel in the socket, $i$, in such a position that the handle of the stopcock, $g$, will project through the opening, $k$, of said socket, and the capillary stem, $e$, will pass through the opening, $l$. The opening, $k$, enables the operator to adjust the stopcock, $g$, without removing the funnel from the socket. $j$ indicates a bridge for connecting the sockets, $i$. After arranging the funnel in this manner I suspend the socket, $i$, on a centrifuge by means of the bridge, $j$, and subject the solution to a whirling process for about one minute. At the expiration of this period I remove the socket from the centrifuge and turn on the stopcock, $g$, so as to permit the aqueous solution to escape from the barrel, $a$, through the bore hole, $h$. The aqueous solution is permitted to flow off as completely as possible without endangering loss of the butter fat which remains in the funnel. This operation extracts the salt from the butter and the salt is carried from the funnel with the flow of the aqueous solution. When the funnel is freed of the aqueous solution I again adjust the stopcock, $g$, and pour in the barrel, $a$, while very hot a mixture of equal parts of concentrated sulfuric acid and water. The contents are thoroughly mixed by giving the funnel a circular motion. The socket is again suspended on the centrifuge and agitated in the manner hereinbefore mentioned for one minute. I then turn on the stopcock, $g$, and allow the acid solution to escape through the capillary stem, $e$, until the fat layer nearly reaches the stopcock. Whereupon I again subject the funnel to a whirling process on a centrifuge, then remove the funnel from the socket and permit the butter fat to run down through the stopcock until it reaches the tip of the capillary stem, $e$. At this stage of the process I weigh the separatory funnel containing the fat, and this weight minus the previously ascertained weight of the empty and dry separatory funnel is the correct weight of the fat in the sample of butter tested. The percentage is computed in the usual well known manner.

In the process disclosed one or more tests of different samples of butter may be made at the same time. In Fig. 2 of the drawing I have illustrated a pair of funnels arranged in a pair of sockets. When more than one test is desired to be made simultaneously it is only necessary to place the samples in separate funnels and place the funnels in separate sockets and centrifuge them in the manner shown.

Having thus described my invention I claim:

1. A method for determining the fat content of butter, consisting in placing the butter in a container with hot water, centrifuging the solution, removing the aqueous solution from the container and adding thereto an equal mixture of sulfuric acid and water, again centrifuging the contents and partially drawing off the acid solution, then subjecting the contents to a second centrifuging, and weighing the container and the butter fat substantially as specified.

2. A method for determining the fat content of butter, consisting in placing the butter in a suitable container, filling the container with hot water and subjecting the container to a whirling process on a centrifuge, removing the aqueous solution from the container and adding to the container while hot a mixture of equal parts of sulfuric acid and water, again centrifuging the container, then partially removing the second solution therefrom, and subjecting the container to a second centrifuging, and then weighing the container and the butter fat, substantially as specified.

In testimony whereof, I affix my signature in the presence of two subscribed witnesses.

ROSCOE H. SHAW.

Witnesses:
CHARLES W. BOYLE,
EDWIN S. FRENCH.